(12) United States Patent
Zatloukal et al.

(10) Patent No.: US 11,657,124 B2
(45) Date of Patent: May 23, 2023

(54) INTEGRATING BINARY INFERENCE ENGINES AND MODEL DATA FOR EFFICIENCY OF INFERENCE TASKS

(71) Applicant: Apple Inc., Cupertino, CA (US)

(72) Inventors: Peter Zatloukal, Seattle, WA (US); Matthew Weaver, Bellevue, WA (US); Alexander Kirchhoff, Seattle, WA (US); Dmitry Belenko, Redmond, WA (US); Ali Farhadi, Seattle, WA (US); Mohammad Rastegari, Bothell, WA (US); Andrew Luke Chronister, Seattle, WA (US); Keith Patrick Wyss, Seattle, WA (US); Chenfan Sun, Redmond, WA (US)

(73) Assignee: Apple Inc., Cupertino, CA (US)

( * ) Notice: Subject to any disclaimer, the term of this patent is extended or adjusted under 35 U.S.C. 154(b) by 213 days.

(21) Appl. No.: 16/215,540

(22) Filed: Dec. 10, 2018

(65) Prior Publication Data

US 2020/0184037 A1 Jun. 11, 2020

(51) Int. Cl.
*G06F 21/10* (2013.01)
*G06N 3/08* (2006.01)
(Continued)

(52) U.S. Cl.
CPC ............ *G06F 21/105* (2013.01); *G06F 21/12* (2013.01); *G06N 3/08* (2013.01); *G06N 3/10* (2013.01);
(Continued)

(58) Field of Classification Search
CPC ......... G06F 21/105; G06F 21/12; G06N 3/08; G06N 3/10; H04L 9/0891; H04L 9/30
(Continued)

(56) References Cited

U.S. PATENT DOCUMENTS

2003/0229605 A1 * 12/2003 Herrera .................. G06N 5/046
706/47
2016/0072807 A1 * 3/2016 Park ....................... H04L 9/3263
713/171
(Continued)

FOREIGN PATENT DOCUMENTS

| WO | WO 2018/111270 | 6/2018 | |
| WO | WO-2018111270 A1 * | 6/2018 | ......... G06F 21/6218 |
| WO | WO 2018/217965 | 11/2018 | |

OTHER PUBLICATIONS

International Search Report and Written Opinion from PCT/US2019/065542, dated Apr. 9, 2020, 11 pages.

*Primary Examiner* — Kambiz Zand
*Assistant Examiner* — Phuc Pham
(74) *Attorney, Agent, or Firm* — Bakerhostetler

(57) ABSTRACT

In one embodiment, a method includes receiving a user request from a client device associated with a user, accessing an instructional file comprising one or more binary inference engines and one or more encrypted model data corresponding to the one or more binary inference engines, respectively, selecting a binary inference engine from the one or more binary inference engines in the accessed instructional file based on the user request, sending a validation request for a permission to execute the binary inference engine to a licensing server, receiving the permission from the licensing server, decrypting the encrypted model data corresponding to the binary inference engine by a decryption key, executing the binary inference engine based on the user request and the decrypted model data, and sending one or more execution results responsive to the execution of the binary inference engine to the client device.

20 Claims, 4 Drawing Sheets

(51) Int. Cl.
*G06N 3/10* (2006.01)
*H04L 9/30* (2006.01)
*H04L 9/08* (2006.01)
*G06F 21/12* (2013.01)

(52) U.S. Cl.
CPC .............. *H04L 9/0891* (2013.01); *H04L 9/30* (2013.01); *G06F 2221/0755* (2013.01)

(58) Field of Classification Search
USPC .......................................................... 726/26
See application file for complete search history.

(56) References Cited

U.S. PATENT DOCUMENTS

| | | |
|---|---|---|
| 2016/0285866 A1 | 9/2016 | Allen et al. |
| 2018/0089574 A1 | 3/2018 | Goto |
| 2019/0197435 A1* | 6/2019 | Kobayashi ............. G06N 20/00 |
| 2019/0391956 A1* | 12/2019 | Kozhaya ............. G06F 9/44521 |
| 2020/0036510 A1* | 1/2020 | Gomez ................... G06N 3/08 |

* cited by examiner

INTEGRATING BINARY INFERENCE ENGINES AND MODEL DATA FOR EFFICIENCY OF INFERENCE TASKS

TECHNICAL FIELD

This disclosure generally relates to software optimization, and in particular relates to software optimization for machine-learning based data analysis.

BACKGROUND

In computer science, program optimization or software optimization is the process of modifying a software system to make some aspect of it work more efficiently or use fewer resources. In general, a computer program may be optimized so that it executes more rapidly, or to make it capable of operating with less memory storage or other resources. Optimization may occur at a number of levels. Typically, the higher levels may have greater impact and may be harder to change later on in a project, requiring significant changes or a complete rewrite if they need to be changed. Thus, optimization may typically proceed via refinement from higher to lower, with initial gains being larger and achieved with less work, and later gains being smaller and requiring more work. However, in some cases overall performance may depend on performance of very low-level portions of a program, and small changes at a late stage or early consideration of low-level details may have outsized impact. Typically, major optimization may be often considered a refinement to be done late, if ever. On longer-running projects there may be typically cycles of optimization, where improving one area reveals limitations in another, and these are typically curtailed when performance is acceptable, or gains become too small or costly.

Machine learning (ML) is the study of algorithms and mathematical models that computer systems use to progressively improve their performance on a specific task. Machine learning algorithms build a mathematical model of sample data, known as "training data", in order to make predictions or decisions without being explicitly programmed to perform the task. Machine learning algorithms are used in the applications of email filtering, detection of network intruders, and computer vision, where it is infeasible to develop an algorithm of specific instructions for performing the task. Machine learning is closely related to computational statistics, which focuses on making predictions using computers. The study of mathematical optimization delivers methods, theory and application domains to the field of machine learning. Data mining is a field of study within machine learning and focuses on exploratory data analysis through unsupervised learning. In its application across business problems, machine learning is also referred to as predictive analytics.

SUMMARY OF PARTICULAR EMBODIMENTS

In particular embodiments, an execution system may combine both a binary inference engine and its associated model data in a single module, such that the entire engine/model are self-contained in a single module. In particular embodiments, the single module may be stored as a particular file comprising one or more of a dynamic link library (dll) file or an extended binary (xb) file. A dll/xb file may be used for holding multiple codes and procedures. As an example and not by way of limitation, a user may use an application running on a client device or a computer attached to a video camera and speaker. The application may dynamically link to an xb file. The user may use the application to classify a scene with humans in it. With the "people_detector.xb" file dynamically loaded at runtime, the application may output a wave file through the speaker that says "person." The user may further use the application to classify the emotional state of the detected person. Without recompiling the application, the execution system may swap out "people_detector.xb" file with "emotion_detector.xb" on a disk, re-launch the application, and the speaker may say "happy" or "sad." In particular embodiments, the aforementioned implementations may combine the binary inference engine and the model data using a linker. As a result, at runtime the execution system may have the capability to self-extract (to memory or temporary storage) the required model (e.g., parameters, etc.). The execution system may further construct a machine-learning architecture based on declarative data in the memory or in the data portion of the particular file (e.g., xb file). In particular embodiments, a single particular file may have multiple binary inference engines. Accordingly, the execution system may enumerate them via one or more application programming interfaces (APIs). In particular embodiments, the execution system may assist users to solve a plurality of tasks efficiently and effectively by integrating machine-learning models and their relevant model data. Although this disclosure describes implementing particular files comprising particular models in particular manners, this disclosure contemplates implementing any suitable file comprising any suitable model in any suitable manner.

In particular embodiments, the execution system may receive, from a client device associated with a user, a first user request. The execution system may then access an instructional file. The instructional file may comprise one or more binary inference engines and one or more encrypted model data corresponding to the one or more binary inference engines, respectively. In particular embodiments, the execution system may select, based on the first user request, a first binary inference engine from the one or more binary inference engines in the accessed instructional file. The execution system may then send, to a licensing server, a validation request for a permission to execute the first binary inference engine. In particular embodiments, the execution system may then receive the permission from the licensing server. The execution system may then decrypt, by a decryption key, the encrypted model data corresponding to the first binary inference engine. The execution system may further execute the first binary inference engine based on the first user request and the decrypted model data. In particular embodiments, the execution system may send, to the client device responsive to the first user request, one or more execution results responsive to the execution of the first binary inference engine.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
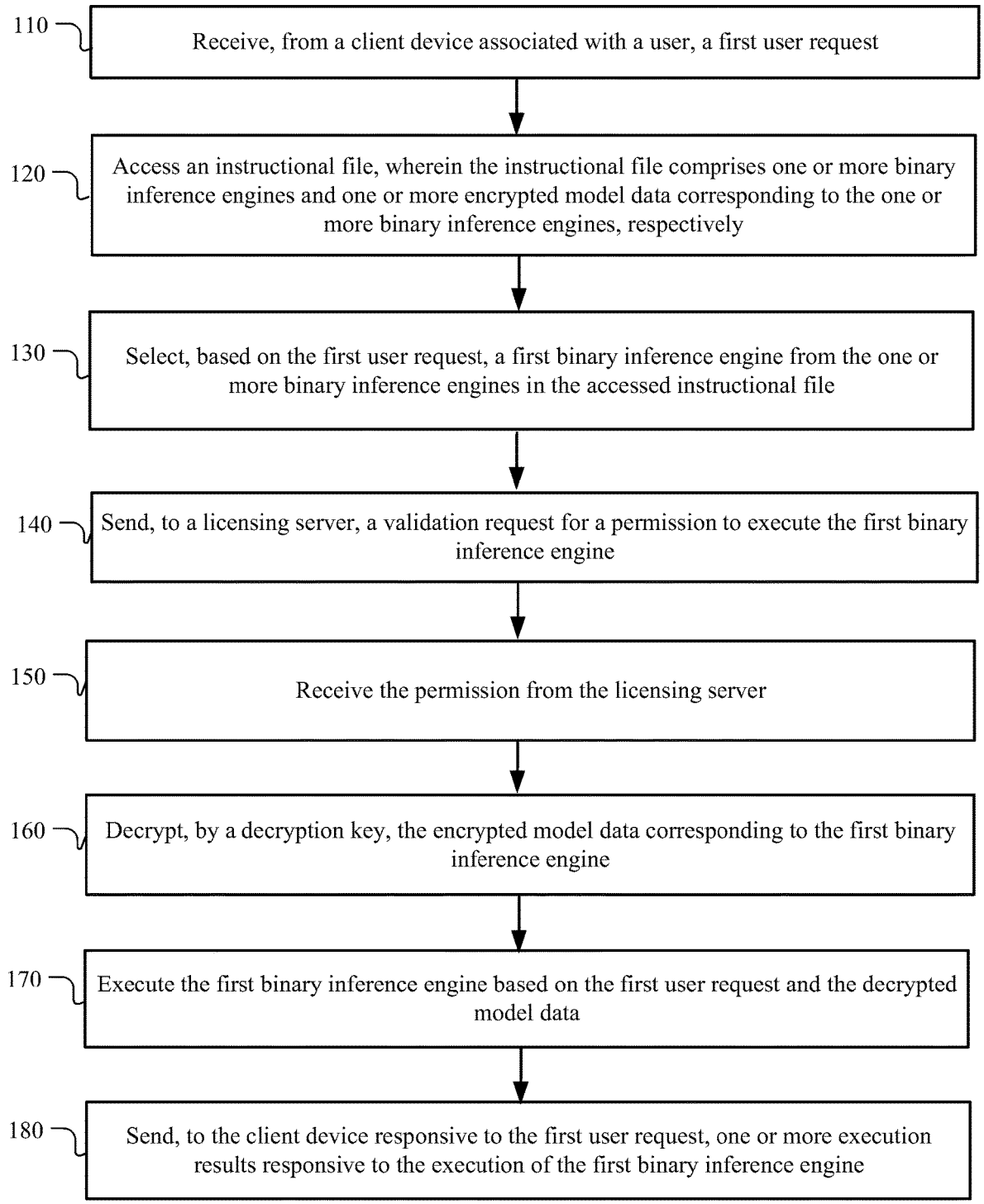
FIG. 1 illustrates an example method for integrating a binary inference engine with model data.

Integrating Binary Inference Engines and Model Data for Efficiency of Inference Tasks In particular embodiments, the execution system may integrate one or more binary inference engines and their respective model data into a single instructional file (e.g., a dll/xb file), which may save the computational cost (e.g., memory) at runtime. In particular embodiments, each of the one or more binary inference engines may comprise one or more machine-learning models. The one or more machine-learning models may be based on neural networks. As an example and not by way of limitation, for machine-learning models based on neural networks, the model data may comprise weighted parameters associated with the neural networks. In particular embodiments, the instructional file may comprise one or more of a dll file in a Windows operating system or a shared object in a Linux operating system. In particular embodiments, the dll file or shared object may define the location of the code portions of the binary inference engine, the components that initialize memories, how to set up the binary inference engine correctly, and how to load other relevant components or data. In particular embodiments, when the machine-learning models in a binary inference engine are based on neural networks, the execution system may capitate the model data including parameters, weights, and declared syntaxes associated with the layers of the neural network architecture at the end of an executable block of the neural networks. In particular embodiments, when the instructional file (e.g., dll file) is initialized by an application installed on a client device, the execution system may further integrate the binary inference engine, as a simple input, to the back of the instructional file (e.g., dll file) using a linker. In particular embodiments, the execution system may further initialize the binary inference engine. The binary inference engine may then figure out where it was loaded from, where the offset is in the binary inference engine, and where a possible contamination of the model data may have occurred. In particular embodiments, the binary inference engine may further load the model data from the back of the instructional file. Although this disclosure describes integrating particular inference engines and particular model data in particular manners, this disclosure contemplates integrating any suitable inference engine and any suitable model data in any suitable manner.

In particular embodiments, the execution system may integrate a binary inference engine into an instructional file in two ways. The first way may be based on concatenation. In particular embodiments, the execution system may take a pre-compiled instructional file and cast the binary inference engine onto the end of the pre-compiled instructional file. The execution system may then access the loaded code of the binary inference engine. The loaded code may be in a known block of memory in the compiled binary instructional file. The execution system may then append the offset of the instructional file to where that data portion of the binary inference engine begins. As an example and not by way of limitation, a pre-complied dll file may be of 1024 bytes. The execution system may encode the 1025-th byte as a known offset. As a result, the known offset may be where the execution system seeks in the instructional file after loading the instructional file to find the data payload of the binary inference engine. The second way may be based on one or more linkers. In particular embodiments, a linker may perform the last stage of compilation of higher level code to machine code. The one or more linkers may perform the concatenation of the binary inference engine and the model data by incorporating data blocks into a resulting binary instructional file. In particular embodiments, the execution system may use both aforementioned ways to integrate a binary inference engine into an instructional file. Although this disclosure describes integrating particular inference engines into particular files in particular manners, this disclosure contemplates integrating any suitable inference engine into any suitable file in any suitable manner.

In particular embodiments, the binary inference engine may dynamically generate particular artificial neural network architectures at runtime if the machine-learning models in the binary inference engine are based on neural networks. In particular embodiments, the declared syntaxes in the model data may define the structure of the neural networks, i.e., what the specific layers of the artificial neural network should be instantiated in memory to execute a particular task. In particular embodiments, the binary inference engine may dynamically generate the neural network architecture based on the declared syntaxes without assuming a particular neural network architecture. As an example and not by way of limitation, resnet-50 is a very specific artificial neural network architecture. However, the binary inference engine, when being executed, may not initialize being already compiled to generate an in-memory architecture of resnet-50. Instead, the binary inference engine may check the model data and the machine-learning models. For example, the checking of the model data may reveal that the data is in a format of JavaScript Object Notation (JSON), which is an open-standard file format that uses human-readable text to transmit data objects consisting of attribute-value pairs and array data types (or any other serializable value). The JSON file may describe the layers of the neural network architecture, how they connect, detailed description of the connections, the types of necessary operations, and etc. Based on the JSON file, the binary inference engine may generate a neural network architecture comprising those particular layers in memory, instantiate these layers, and load the model data associated with the machine-learning model based on such neural network architecture. In addition to the JSON file, the binary inference engine may also need to be provided with a priori knowledge on the types of the layers at runtime. As an example and not by way of limitation, for computer vision tasks, a binary inference engine may check the JSON file and follow the instruction in the JSON file to generate a basic neural network. The binary inference engine may then generate a two-dimensional (2D) convolutional layer, followed by a first pooling layer, followed by another 2D convolutional layer, followed by a second pooling layer, followed by a softmax layer and finally an output layer. The binary inference engine may be able to instantiate those layers only when it knows what comprises a 2D convolution layer, a pooling layer, a softmax layer, etc. Although this disclosure describes generating particular network architectures in particular manners, this disclosure contemplates generating any suitable network architecture in any suitable manner.

In particular embodiments, each of the one or more binary inference engines may comprise one or more components. In particular embodiments, after selecting the first binary inference engine, the execution system may determine one or more of the one or more components of the first binary inference engine to parallelize. In particular embodiments, the execution system may further execute the first binary inference engine by executing the determined components of the first binary inference engine in parallel. As a result, the execution system may have a technical advantage over conventional work as the conventional work may instantiate some components that do not readily parallelize at runtime. Continuing with the previous example of artificial convolutional neural network, conventional work may determine parallel operations between different layers (i.e., components of a binary inference engine) based on the JSON file. However, if there is a linkage between two layers (e.g., an input layer and a layer close to the input layer) where a parallel operation is unwanted, the conventional work may still instantiate these two layers in parallel even if they do not readily parallelize at runtime, which may lead to problematic result of the running of the artificial convolutional neural network. By contrast, the execution system may rely on compilers to determine which components (e.g., layers of artificial convolutional neural network) of the binary inference engine to parallelize. The determination may occur either at runtime or at compiling time of the application installed on a client device. The determination may be similar to compiler optimization stages for figuring out which parts of the code can be run in parallel, thereby resulting in gains of optimization performance. Although this disclosure describes parallelizing particular components in particular manners, this disclosure contemplates parallelizing any suitable component in any suitable manner.

In particular embodiments, the execution system may use various ways to protect the model data in conjunction with the binary inference engine. In particular embodiments, protecting each of the one or more model data may comprise encrypting the model data in different ways. In particular embodiments, each of the one or more encrypted model data may be generated based on an encryption key. As an example and not by way of limitation, the binary inference engine may comprise an inference level and an encryption key may reside in the binary structure of the inference level. In particular embodiments, the encrypted model data corresponding to the binary inference engine may comprises one or more of parameters associated with the one or more machine-learning models, weights associated with the one or more machine-learning models, declared syntaxes associated with the one or more machine-learning modes, or descriptions associated with the one or more machine-learning models. Although this disclosure describes encrypting particular data in particular manners, this disclosure contemplates encrypting any suitable data in any suitable manner.

In particular embodiments, the first binary inference engine selected from the one or more binary inference engines may connect to a licensing server upon initiation and require a runtime check from the licensing server either periodically or continuously. The licensing server may either permit or deny the first binary inference engine from running. Assuming that the first binary inference engine does not get a permission from the licensing server, the first binary inference engine may not execute. In particular embodiments, the licensing server may use public-private key cryptography-based methods for validation. In particular embodiments, the first binary inference engine may be associated with a public key and the validation request from the first binary inference engine may comprise the public key. Accordingly, the permission may be generated based on a validation of the public key by the licensing server. As an example and not by way of limitation, the licensing server may validate cryptographically the right signature on the public key. In particular embodiments, the licensing server may issue chained private keys to the computing systems where the binary inference engines run. The licensing server may partially revoke the chained private keys in a hierarchical fashion if these key are not used by the computing systems appropriately. In particular embodiments, the permission for running a binary reference engine may be based on a combination of validating both private keys and public keys. As an example and not by way of limitation, a hardware unique private key may be stored in a non-volatile fashion on every single computing system that comes off of the factory line and a public key may be also generated for the computing system. The licensing server may have knowledge of all the issued private keys, either unique to one computing system or unique to a group of computing systems. The licensing server may be contacted by the computing systems on a periodical basis exchanging information of a combination of the public key and private keys. As a result, secure connections can be established between the computing systems and the licensing server based on the public key. In particular embodiments, the private key for each computing system may be issued once the licensing server receives the public key. The licensing server may transit back the private key to the computing system. The private key may be further used for decryption of the model data associated with a binary inference engine. Such process of issuing private keys upon receiving a public key by a license server may add additional security layers to the execution system. In particular embodiments, issuing private keys upon receiving a public key by a license server may be implemented on a per computing system basis, which may help prevent the inappropriate use of the same private key for different computing systems. In particular, the licensing server may notice too many computing systems calling back the licensing server and asking for their private keys. Subsequently, the licensing server may potentially revoke these private keys, thereby making all of those computing systems disabled. In particular embodiments, these computing systems being disabled may indicate that a binary inference engine running on one of these computing systems may no longer allow itself to execute the code and decrypt the model data because of the revocation of the private key. Although this disclosure describes validating particular inference engines in particular manners, this disclosure contemplates validating any suitable inference engine in any suitable manner.

In particular embodiments, the binary inference engine may decrypt the encrypted model data on a one-off basis. Continuing with the previous example in which the encryption key resides in the binary structure of the inference level, the binary inference engine may load the model data into memory and then decrypt it with the decryption key when the inference level initiates. In particular embodiments, the decryption key may be the private key that is issued by the licensing server. In particular embodiments, the decryption key may comprise a unique identifier associated with the computing system where the binary inference engine runs. As an example and not by way of limitation, the unique identifier associated with the computing system may comprise one or more of a hardware identifier or a media access control (MAC) address. For example, the binary inference engine may decrypt the encrypted model data as follows. The binary inference engine may first load and initiate itself and then load the encrypted model data into memory. The binary inference engine may not find a decryption key within the binary inference engine. As a result, the binary inference engine may inspect the MAC address of the computing system. The binary inference engine may further attempt to decrypt the encrypted model data using the MAC address. If the decryption is successful, it may indicate that the binary inference engine is licensed to use the model data and its associated machine-learning model on the particular computing system. In particular embodiments, the decryption key may comprise any unique hardware key. As an example and not by way of limitation, if there is a unique key in the microprocessor, such key may be also used as the decryption key. Although this disclosure describes decrypting particular data in particular manners, this disclosure contemplates decrypting any suitable data in any suitable manner.

In particular embodiments, each of the one or more inference engines may be associated with an expiration condition. The expiration condition may be based on one or more of time or a number of executions completed by the binary inference engine. In particular embodiments, the expiration condition may be administrated by the runtime portion of the binary inference engine. As an example and not by way of limitation, the binary inference engine may administrate the expiration condition by checking how many days or months the code of the binary inference engine has been running for tasks associated with evaluations. This may be mostly helpful for the case that the code for evaluation should not be allowed to be turned into a production code. In particular, a number of days may be predetermined. The binary inference engines may run the code during the predetermined number of days and then force the end of the running of the code once the time reaches the predetermined number of days. As another example and not by way of limitation, a number of executions for a particular binary inference engine may be predetermined and the binary inference engine may stop running the code after the predetermined number of executions is reached. For example, the binary inference engine may perform a million inferences as a classifier. After the millionth and one, the binary inference engine may refuse to perform any more classification, perhaps by returning a message indicating that an error has occurred, no classification can be done, or no class was found for a user's requested task. Although this disclosure describes particular conditions associated with particular inference engines in particular manners, this disclosure contemplates any suitable condition associated with any suitable inference engine in any suitable manner.

In particular embodiments, each of the one or more binary inference engines and its respective encrypted model data may be associated by a linker. Each binary inference engine and its respective encrypted model data may be considered as an inference bundle. In particular embodiments, the linker may function as a modular distribution vehicle to allow the execution system to easily switch between different inference bundles without recompiling an application installed on a client device if the application calls the inference bundle to function. In particular embodiments, the first user request may be received from an application installed on the client device. In particular embodiments, executing the first binary inference engine may be responsive to a first compilation of the application. In particular embodiments, the execution system may further receive, from the application installed on the client device associated with the user, a second user request. The execution system may then access the instructional file. The execution system may select, based on the second user request, a second binary inference engine from the one or more binary inference engines in the accessed instructional file. The execution system may send, to the licensing server, a validation request for a permission to execute the second binary inference engine. The execution system may then receive the permission from the licensing server. The execution system may decrypt, by the decryption key, the encrypted model data corresponding to the second binary inference engine. The execution system may further execute the second binary inference engine based on the second user request and the decrypted model data responsive to the first compilation of the application. Responsive to the first compilation of the application means that the application does not need recompiling as compared to a requirement of compiling after receiving the first user request. The execution system may subsequently send, to the client device responsive to the second user request, one or more execution results responsive to the execution of the second binary inference engine. As an example and not by way of limitation, one binary inference engine may be a cat detector, which is associated with an application installed on a smart phone with camera. The cat detector may be stored in an xb file. The application may be compiled for the use of the cat detector. If the user wants to use a dog detector through the same application, the execution system may simply replace the xb file with another xb file which comprises a dog detector and the application does not need to be recompiled. As a result, the smart phone with camera, instead of detecting cats, now only detects dogs. Although this disclosure describes particular linkers associated with particular inference engines and particular data in particular manners, this disclosure contemplates any suitable linker associated with any suitable inference engine and any suitable data in any suitable manner.

FIG. 1 illustrates an example method 100 for integrating a binary inference engine with model data. The method may begin at step 110, where the execution system may receive, from a client device associated with a user, a first user request. At step 120, the execution system may access an instructional file, wherein the instructional file comprises one or more binary inference engines and one or more encrypted model data corresponding to the one or more binary inference engines, respectively. At step 130, the execution system may select, based on the first user request, a first binary inference engine from the one or more binary inference engines in the accessed instructional file. At step 140, the execution system may send, to a licensing server, a validation request for a permission to execute the first binary inference engine. At step 150, the execution system may receive the permission from the licensing server. At step 160, the execution system may decrypt, by a decryption key, the encrypted model data corresponding to the first binary inference engine. At step 170, the execution system may execute the first binary inference engine based on the first user request and the decrypted model data. At step 180, the execution system may send, to the client device responsive to the first user request, one or more execution results responsive to the execution of the first binary inference engine. Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates an example method for integrating a binary inference engine with model data including the particular steps of the method of FIG. 1, this disclosure contemplates any suitable method for integrating a binary inference engine with model data including any suitable steps, which may include all, some, or none of the steps of the method of FIG. 1, where appropriate. Furthermore, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1.

Vector Spaces and Embeddings

Figure 2:
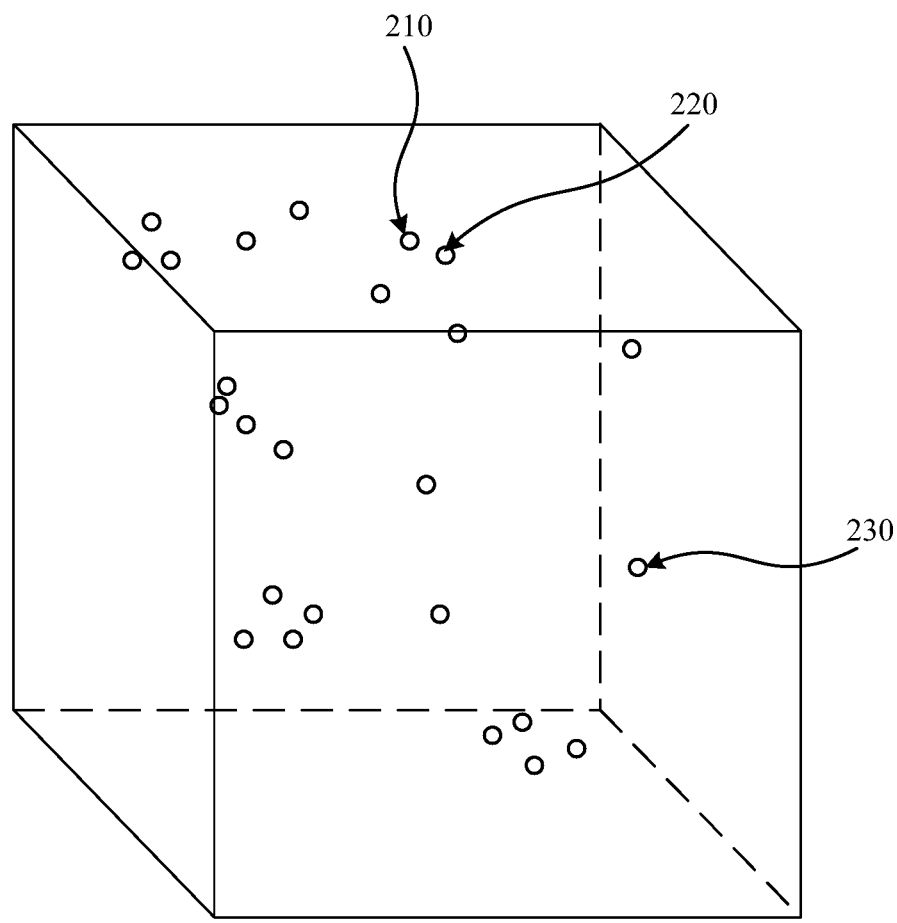
FIG. 2 illustrates an example view of an embedding space.

FIG. 2 illustrates an example view of a vector space 200. In particular embodiments, an object or an n-gram may be represented in a d-dimensional vector space, where d denotes any suitable number of dimensions. Although the vector space 200 is illustrated as a three-dimensional space, this is for illustrative purposes only, as the vector space 200 may be of any suitable dimension. In particular embodiments, an n-gram may be represented in the vector space 200 as a vector referred to as a term embedding. Each vector may comprise coordinates corresponding to a particular point in the vector space 200 (i.e., the terminal point of the vector). As an example and not by way of limitation, vectors 210, 220, and 230 may be represented as points in the vector space 200, as illustrated in FIG. 2. An n-gram may be mapped to a respective vector representation. As an example and not by way of limitation, n-grams $t_1$ and $t_2$ may be mapped to vectors $\vec{v_1}$ and $\vec{v_2}$ in the vector space 200, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 200. In particular embodiments, an n-gram may be mapped to a vector representation in the vector space 200 by using a machine leaning model (e.g., a neural network). The machine learning model may have been trained using a sequence of training data (e.g., a corpus of objects each comprising n-grams).

In particular embodiments, an object may be represented in the vector space 200 as a vector referred to as a feature vector or an object embedding. As an example and not by way of limitation, objects $e_1$ and $e_2$ may be mapped to vectors $\vec{v_1}$ and $\vec{v_2}$ in the vector space 200, respectively, by applying a function $\vec{\pi}$, such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the execution system may calculate a similarity metric of vectors in vector space 200. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\|\|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 200. As an example and not by way of limitation, vector 210 and vector 220 may correspond to objects that are more similar to one another than the objects corresponding to vector 210 and vector 230, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S.

patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 3:
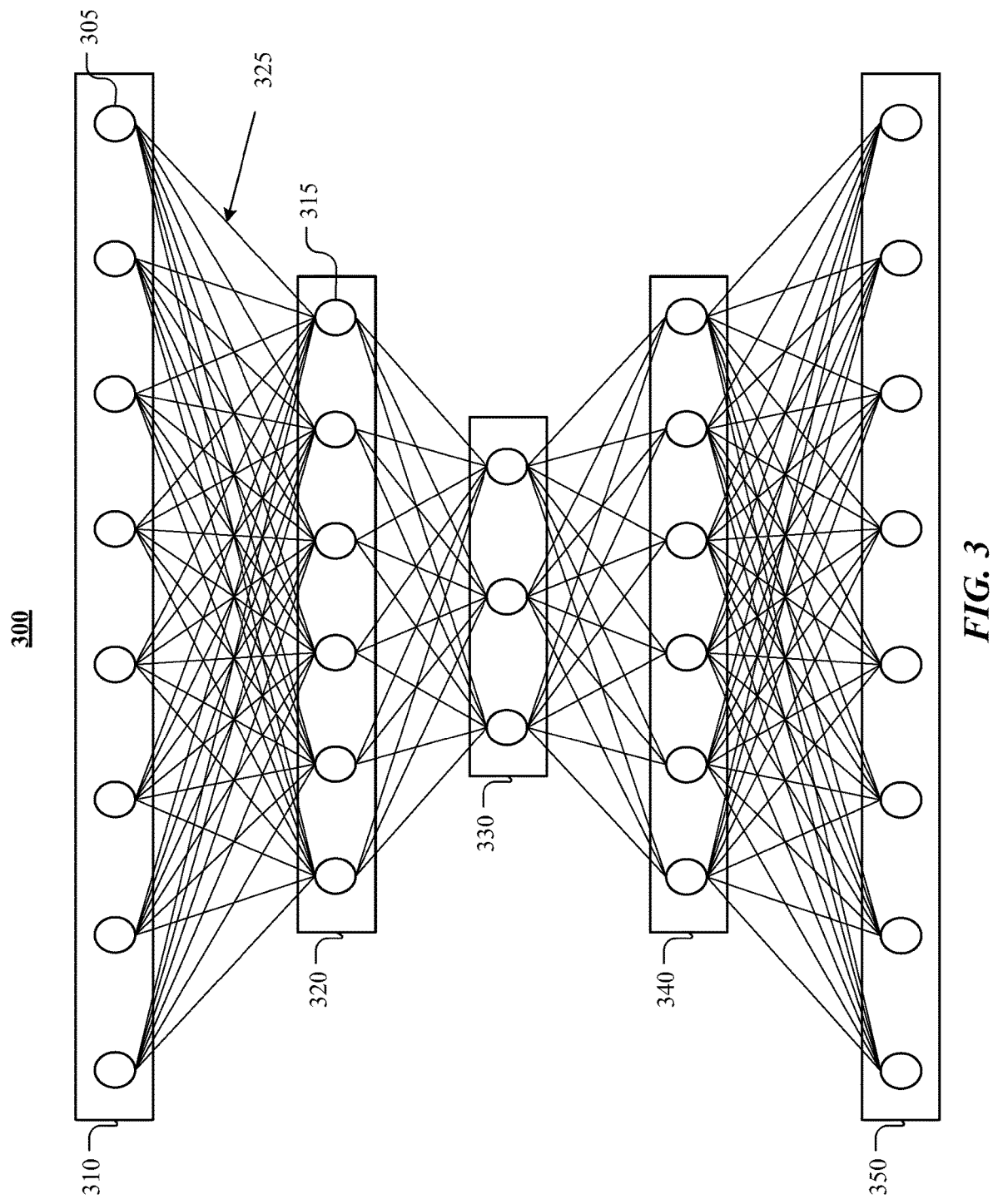
FIG. 3 illustrates an example artificial neural network.

FIG. 3 illustrates an example artificial neural network ("ANN") 300. In particular embodiments, an ANN may refer to a computational model comprising one or more nodes. Example ANN 300 may comprise an input layer 310, hidden layers 320, 330, 340, and an output layer 350. Each layer of the ANN 300 may comprise one or more nodes, such as a node 305 or a node 315. In particular embodiments, each node of an ANN may be connected to another node of the ANN. As an example and not by way of limitation, each node of the input layer 310 may be connected to one or more nodes of the hidden layer 320. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 3 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 3 depicts a connection between each node of the input layer 310 and each node of the hidden layer 320, one or more nodes of the input layer 310 may not be connected to one or more nodes of the hidden layer 320.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 320 may comprise the output of one or more nodes of the input layer 310. As another example and not by way of limitation, the input to each node of the output layer 350 may comprise the output of one or more nodes of the hidden layer 340. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F (x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{s^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 325 between the node 305 and the node 315 may have a weighting coefficient of 0.4, which may indicate that 0.4 multiplied by the output of the node 305 is used as an input to the node 315. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 300 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Systems and Methods

Figure 4:
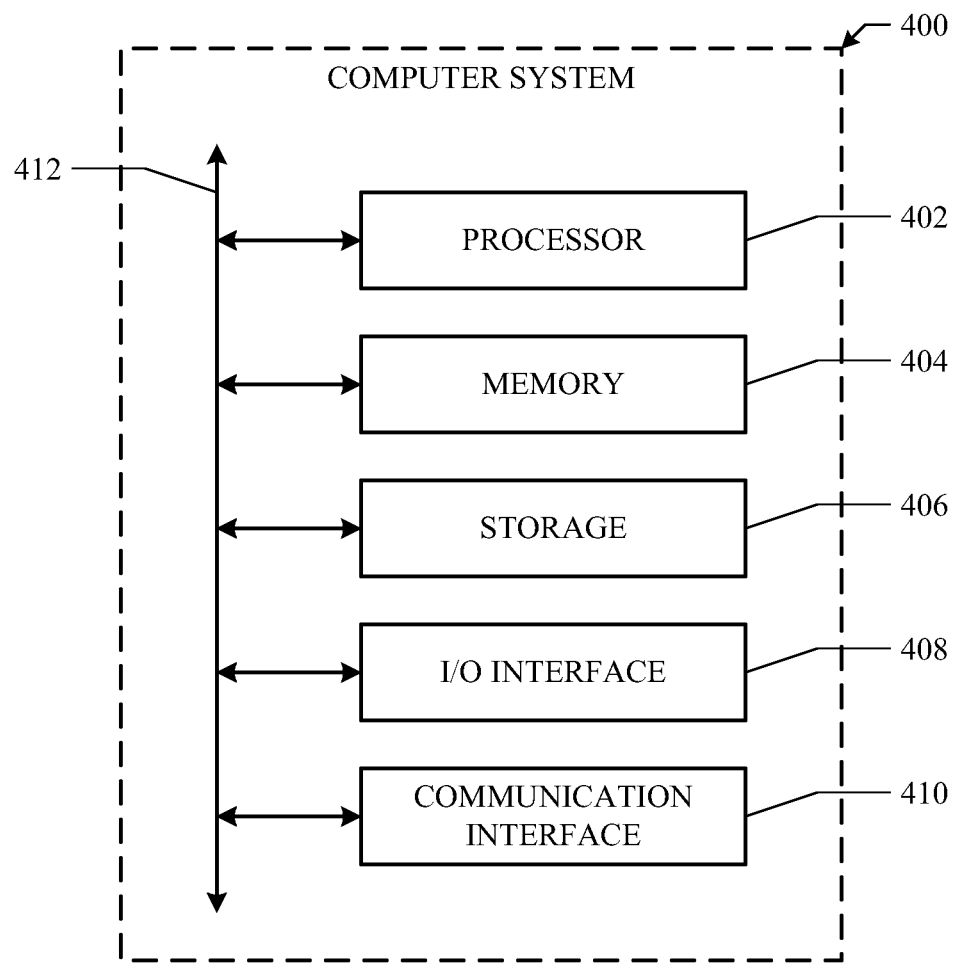
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   receiving, from a client device associated with a user, a first user request;

accessing an instructional file in response to the first user request, wherein the instructional file comprises a binary inference engine and encrypted model data corresponding to the binary inference engine, the encrypted model data comprising at least one of: a weight used in the binary inference engine or a declared syntax used in the binary inference engine;

decrypting, by a decryption key, the encrypted model data corresponding to the binary inference engine;

executing the binary inference engine based on the first user request and using the decrypted model data; and sending, to the client device responsive to the first user request, one or more execution results responsive to the execution of the binary inference engine.

2. The method of claim 1, wherein the binary inference engine and the encrypted model data are associated by a linker.

3. The method of claim 1, wherein the binary inference engine comprises one or more machine-learning models.

4. The method of claim 3, wherein the one or more machine-learning models are based on neural networks and the encrypted model data corresponding to the binary inference engine further comprises one or more of:
parameters used in the one or more machine-learning models; or
descriptions associated with the one or more machine-learning models.

5. The method of claim 1, wherein the decryption key comprises a unique identifier associated with the computing system.

6. The method of claim 5, wherein the unique identifier associated with the computing system comprises one or more of a hardware identifier or a media access control (MAC) address.

7. The method of claim 1, wherein the binary inference engine is associated with an expiration condition.

8. The method of claim 7, wherein the expiration condition is based on one or more of time or a number of executions completed by the binary inference engine.

9. The method of claim 1, wherein the binary inference engine comprises one or more components.

10. The method of claim 9, wherein the binary inference engine comprises one or more components and the method further comprising:
determining one or more of the one or more components of the binary inference engine to parallelize.

11. The method of claim 1, further comprising:
sending, to a licensing server, a validation request for a permission to execute the binary inference engine, wherein the binary inference engine is associated with a public key, and wherein the validation request comprises the public key; and
receiving the permission from the licensing server, wherein the permission is generated based on a validation of the public key by the licensing server.

12. The method of claim 1, wherein the instructional file comprises a plurality of binary inference engines and a corresponding plurality of model data, respectively and accessing the instructional file comprises dynamically linking, by an application, to the instructional file at runtime.

13. The method of claim 1, further comprising:
receiving, from an application installed on the client device associated with the user, a second user request;
accessing the instructional file;
selecting, based on the second user request, another binary inference engine from the instructional file;

sending, to a licensing server, a validation request for a permission to execute the other binary inference engine;
receiving the permission from the licensing server;
decrypting, by the decryption key, the encrypted model data corresponding to the another binary inference engine;
executing the other binary inference engine based on the second user request and another decrypted model data; and
sending, to the client device responsive to the second user request, one or more execution results responsive to the execution of the other binary inference engine.

14. The method of claim 1, wherein the encrypted model data comprises the weight used in the binary inference engine, and the weight comprises a weighting coefficient between two nodes in the binary inference engine.

15. The method of claim 1, wherein the encrypted model data comprises the declared syntax and the declared syntax indicates which layers in the binary inference engine should be instantiated to execute a particular task.

16. One or more computer-readable non-transitory storage media embodying software that is operable when executed to:
receive, from a client device associated with a user, a first user request;
access an instructional file in response to the first user request, wherein the instructional file comprises a binary inference engine and encrypted model data corresponding to the binary inference engine, the encrypted model data comprising at least one of: a parameter used in the binary inference engine, a weight used in the binary inference engine or a declared syntax used in the binary inference engine;
decrypt, by a decryption key included in the binary inference engine, the encrypted model data corresponding to the binary inference engine;
execute the binary inference engine based on the first user request and using the decrypted model data; and
send, to the client device responsive to the first user request, one or more execution results responsive to the execution of the binary inference engine.

17. The one or more computer-readable non-transitory storage media of claim 16, wherein the decryption key is included in an inference level of the binary inference engine.

18. The one or more computer-readable non-transitory storage media of claim 16, wherein the decryption key is included in an inference level of the binary inference engine.

19. The one or more computer-readable non-transitory storage media of claim 18, wherein the decryption key resides in a binary structure of the inference level of the binary inference engine.

20. A system comprising: one or more processors; and a non-transitory memory coupled to the processors comprising instructions executable by the processors, the processors operable when executing the instructions to:
receive, from a client device associated with a user, a first user request;
access an instructional file in response to the first user request, wherein the instructional file comprises a binary inference engine and encrypted model data corresponding to the binary inference engine, the encrypted model data comprising at least one of: a parameter used in the binary inference engine, a weight used in the binary inference engine or a declared syntax used in the binary inference engine;

decrypt, by a decryption key, the encrypted model data corresponding to the binary inference engine;
execute the binary inference engine based on the first user request and using the decrypted model data; and
send, to the client device responsive to the first user request, one or more execution results responsive to the execution of the binary inference engine.

\* \* \* \* \*